US006959994B2

(12) United States Patent
Fujikawa et al.

(10) Patent No.: US 6,959,994 B2
(45) Date of Patent: Nov. 1, 2005

(54) CAMERA BUILT-IN TYPE REARVIEW MIRROR DEVICE

(75) Inventors: Yoshihiro Fujikawa, Aichi (JP); Yoshinori Hitomi, Aichi (JP); Hisaya Suzuki, Shizuoka (JP); Akiyoshi Kobayashi, Shizuoka (JP)

(73) Assignee: Murakami Corporation, Shizuoka (JP)

(*) Notice: Subject to any disclaimer, the term of this patent is extended or adjusted under 35 U.S.C. 154(b) by 125 days.

(21) Appl. No.: 10/403,008

(22) Filed: Apr. 1, 2003

(65) Prior Publication Data

US 2003/0214733 A1 Nov. 20, 2003

(30) Foreign Application Priority Data

May 14, 2002 (JP) .............................. 2002-138694

(51) Int. Cl.[7] .......................... G02B 7/182; B60R 1/06; B60R 1/12; H04N 7/18; B60Q 1/26
(52) U.S. Cl. ..................... 359/871; 359/872; 359/507; 359/512; 359/599; 348/148; 348/151; 362/494; 362/510
(58) Field of Search ................................ 359/507, 512, 359/871, 872, 841, 599; 358/148, 151; 340/937; 362/494, 510, 293; 348/148, 151

(56) References Cited

U.S. PATENT DOCUMENTS

| 4,957,358 A | * | 9/1990 | Terada et al. ................ 359/512 |
|---|---|---|---|
| 5,497,306 A | | 3/1996 | Pastrick |
| 5,570,127 A | * | 10/1996 | Schmidt ...................... 348/148 |
| 5,574,443 A | * | 11/1996 | Hsieh .......................... 340/901 |
| 6,151,065 A | * | 11/2000 | Steed et al. ................... 348/148 |
| 6,310,738 B1 | * | 10/2001 | Chu ........................... 359/883 |
| 6,327,791 B1 | * | 12/2001 | Norcross et al. ............... 33/706 |
| 6,509,832 B1 | * | 1/2003 | Bauer et al. .............. 340/425.5 |
| 6,630,888 B2 | * | 10/2003 | Lang et al. ............. 340/815.45 |
| 6,657,176 B2 | * | 12/2003 | Mishima et al. ......... 250/208.1 |
| 6,690,268 B2 | * | 2/2004 | Schofield et al. ............ 340/438 |
| 6,703,925 B2 | * | 3/2004 | Steffel ...................... 340/425.5 |
| 2002/0118282 A1 | * | 8/2002 | Nakamura ................... 348/148 |
| 2003/0098908 A1 | * | 5/2003 | Misaiji et al. ............... 348/148 |
| 2003/0103142 A1 | * | 6/2003 | Hitomi et al. ............... 348/148 |

FOREIGN PATENT DOCUMENTS

| JP | 08216781 | * | 8/1996 |
|---|---|---|---|
| JP | 2000016181 | * | 1/2000 |
| JP | 2000-115759 | | 4/2000 |

(Continued)

Primary Examiner—Ricky D. Shafer
(74) Attorney, Agent, or Firm—Oblon, Spivak, McClelland, Maier & Neustadt, P.C.

(57) ABSTRACT

To provide a camera built-in type rearview mirror device with illumination, wherein rigidity of the mirror housing can be raised, the camera main body part can photo a clear picture by extensive photographing feasible viewing angle through a transparent cover, and built-in of the camera module is simple. Mirror housing 2 includes concave part 2C formed in an opening manner downwardly which is arranged in the vicinity of photographing window 2B where lens 5B of the camera main body part 5A is faced, and capable of accommodating an illumination light source. For this reason, opening area of the photographing window 2B is decreased. Also, the circumference of the photographing window 2B is reinforced by the cross-sectional box type form of the concave part 2C. Especially a bulge part with circular curved section is formed so that the lens of the camera main body part may rush in, to thereby decrease the opening area of the photographing window further. Then rigidity of the mirror housing 2 is further raised.

9 Claims, 5 Drawing Sheets

FOREIGN PATENT DOCUMENTS

| | | | |
|---|---|---|---|
| JP | 2000168440 | * | 6/2000 |
| JP | 2000185597 | * | 7/2000 |
| JP | 2000272418 | * | 10/2000 |
| JP | 2001180375 | * | 7/2001 |
| JP | 2002067794 | * | 3/2002 |

* cited by examiner

CAMERA BUILT-IN TYPE REARVIEW MIRROR DEVICE

FIELD OF THE INVENTION

This invention relates to a rearview mirror device for rearward visual recognition attached to such as door of vehicles for example, more specifically relates to a camera module for downward visual recognition in which the camera module for downward visual recognition is built in.

BACKGROUND OF THE INVENTION

Generally, rearview mirror devices for rearward recognition are attached to the right and left door of a vehicle. However with this rearview mirror device, the road surface ranging from downward to a slantingly forward cannot be visually recognized. For this reason, especially in the field of view seen from a driver's seat of a car, the road surface near the front wheel on the side of a passenger seat serves as a dead angle. When an obstacle exists near this field, there is a possibility of involving this in a front wheel without knowing. Then, in order to avoid such a situation, a camera built-in type rearview mirror device including a camera module capable of visually recognizing the road surface near a front wheel, and its illumination light source is developed variously. (JP-A-2000-115759, U.S. Pat. No. 5,497,306).

In this kind of camera built-in type rearview mirror device, the above-described camera module consists of a camera main body part which includes picture sensors such as lens or CCD (Charge Coupled Device), and picture signal-processing part, and a power supply part, in such a way that the road surface near the front wheel is displayed in a picture on the monitor by outputting the picture signal from a picture signal-processing part to the monitor of the vehicle compartment. And the opening part for the lens of the camera main body part and illumination light source to be faced is formed in a mirror housing where such a camera module is built in. Usually, the opening part is closed by a transparent cover.

By the way, in the aforementioned conventional camera built-in type rearview mirror device, the area of the opening part where the lens and illumination light source of the camera main body part are faced is comparatively large. Therefore, the problem that the rigidity of the mirror housing falls, resulting in trembling vibration that is occurred to the mirror, is pointed out. Moreover, since the position of the lens of the camera main body part is restricted by the transparent cover that closes the opening, the problem that photographing feasible viewing angle is generally narrow, is also pointed out.

Furthermore, since protection against dust and moisture impervious methods are not taken inside of the transparent cover, dirt which invaded in the mirror housing from the circumference of the mirror, etc may adhere to the inside of the transparent cover. In addition, fogging and dew condensation may occur in the inside of the transparent cover due to the rise of the humidity in the mirror housing or the fall of temperature, with the result that the translucency of the transparent cover may fall. Furthermore, the illumination light from an illumination light source may turn in to the lens of the camera main body part. Moreover, when water droplet adheres to the external surface of the transparent cover at the time of rainy weather or after car washing or the like, the incidence light onto the camera main body part may be improperly refracted by the lens action of the water droplet. In such a case, it becomes impossible for the camera main body part to photo a clear picture through a transparent cover.

Furthermore, at least a camera main body part of a camera module is formed integrally with a picture signal-processing part, therefore it is necessary to secure a big accommodation space in the mirror housing. However, in a motor-driven containing type mirror housing equipped with an electric mirror, a mirror surface adjusting actuator and a motor-driven containing unit are arranged therein, to thereby make a difficult situation to secure a big accommodation space, with the result that built-in of a camera module may be hard to achieve.

SUMMARY OF THE INVENTION

According to one aspect of the present invention, a camera built-in rearview mirror device includes a mirror housing, a mirror provided in the mirror housing, a camera module and an illumination light source. The mirror housing has a bottom portion in which a through hole and a concave part are formed. The camera module includes a lens and is provided in the through hole such that the lens faces outside of the mirror housing. The illumination light source is provided in the concave part.

BRIEF DESCRIPTION OF THE DRAWINGS

FIG. 5 is a partially enlarged sectional view showing the cover main part of the transparent cover that faces a lens of the camera main body part as shown in FIG. 2.

PREFERRED EMBODIMENT OF THE INVENTION

Figure 2:
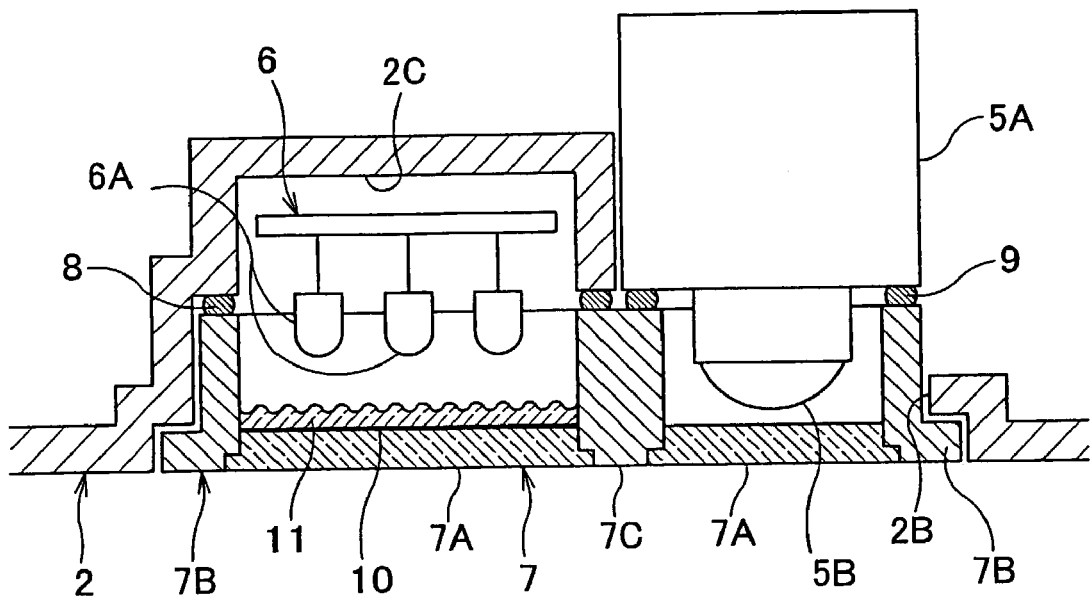
FIG. 2 is a partially enlarged view of a photographing window, which is formed in the lower part of the mirror housing shown in FIG. 1 and the vicinity area of a concave part.
Figure 3:
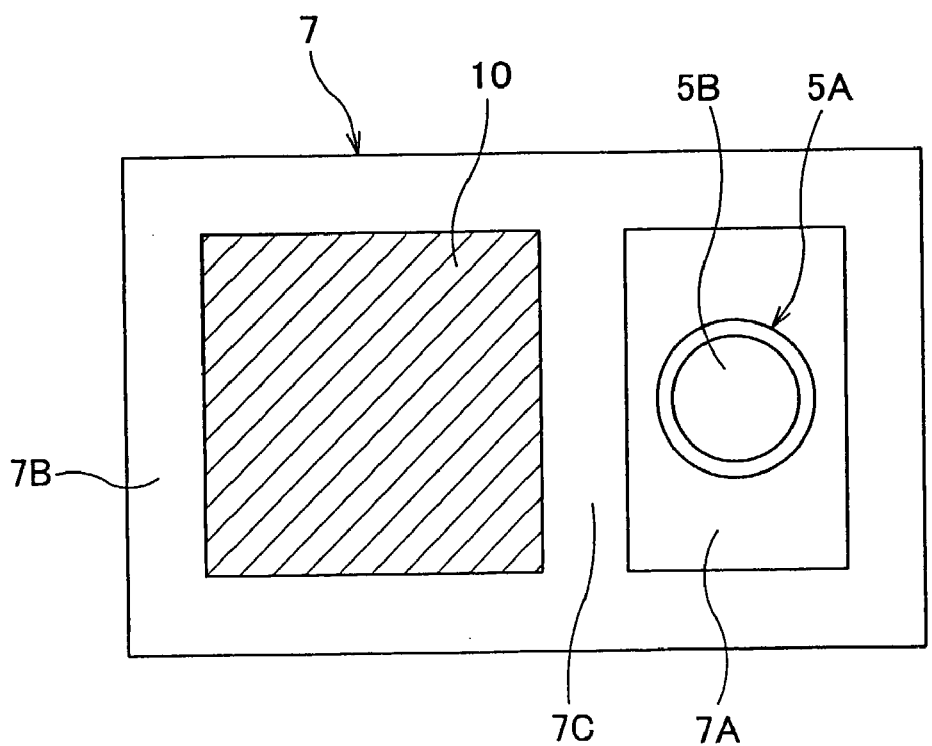
FIG. 3 is a front view of a transparent cover shown in FIG. 2 viewed from the downside.

Hereafter, the embodiment of the camera built-in type rearview mirror device according to this invention will be explained in conjunction with the drawings. In the drawing to refer to, FIG. 1 is a perspective view showing a substantial structure of the inside when removing a mirror from the camera built-in type rearview mirror device according to one mode of the embodiment, FIG. 2 is a partially enlarged sectional view of the photographing window formed in the lower part of the mirror housing shown in FIG. 1 and near the concave part, and FIG. 3 is a front view of the transparent cover shown in FIG. 2 viewed from the lower part of the mirror housing.

Figure 1:
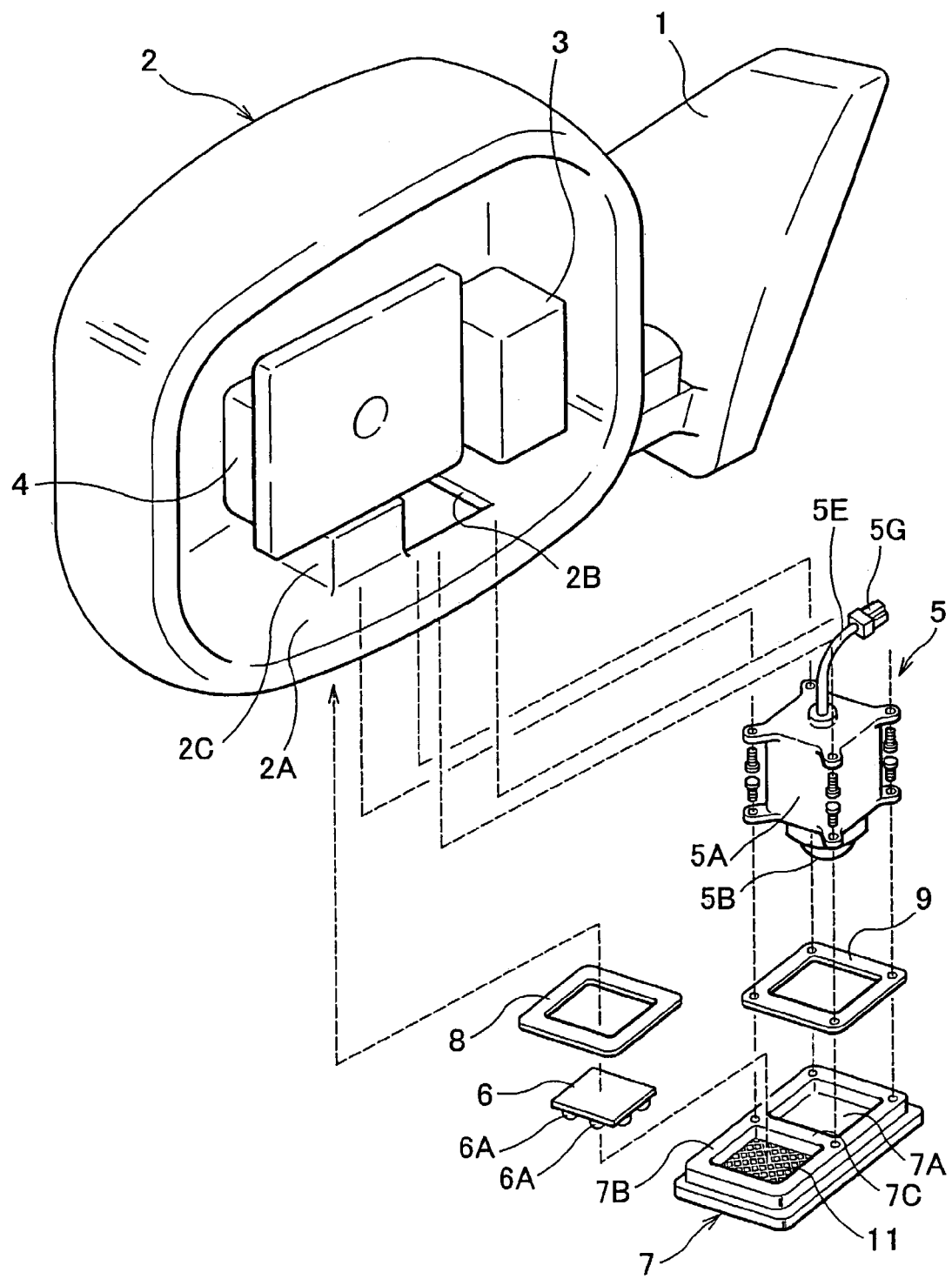
FIG. 1 is a perspective view showing a substantial structure of the inside when removing a mirror from a camera built-in type rearview mirror device according to the embodiment of this invention.

A camera built-in type rearview mirror device of one embodiment is constituted in such a way that as shown in FIG. 1, mirror housing 2 is rotated to mirror base 1 about a substantially perpendicular fulcrum axis by the drive of a motor (not shown) of electric retractable mirror 3, wherein the mirror base 1 is used by being fixed to the side door of a passenger seat side of a vehicle, which is not shown.

Opening part 2A of the rear surface of the mirror housing 2 is equipped with an electric mirror which is not shown, so as to enable free right and left inclination or vertical inclination by the drive of the mirror surface adjusting unit 4. Camera module 5 for downward visual recognition to photo the road surface near the front wheel of a passenger seat side and its illumination light source 6, for example, are built in such mirror housing 2. In order to obtain the above constitution, photographing window 2B where lens 5B is faced and concave part 2C are formed adjacently in the lower part of the mirror housing 2 as shown in the enlarged view of FIG. 2. Wherein the lens 5B of wide angle is equipped in tip end of camera main body part 5A which is serving as the camera module 5, and concave part 2C is capable of accommodating the illumination light source 6. The concave part 2C is formed in the box type section, which opens toward a lower part.

Thus, photographing window 2B with small opening area where lens 5B of the camera main body part 5A is faced, and concave part 2C of the box type section which can accommodate illumination light source 6 are formed as additional processing to mirror housing 2, so that camera module 5 and its illumination light source 6 are built in. The circumference of the photographing window 2B is reinforced by the cross-sectional box type form of concave part 2C. For this reason, in the mirror housing 2, twisting intensity is increased even though the photographing window 2B is opening. This allows no trembling vibration generated in an electric mirror (not shown) even when operational vibration is received from the body of a car.

Here, as shown in FIG. 1 and FIG. 2, the lower part of the mirror housing 2 is equipped with transparent cover 7 for covering the photographing window 2B and concave part 2C. By the above, the surface form of the mirror housing 2 becomes the form having almost no unevenness, to thereby allow no generating of wind noises. Also, a rebound of the pebble and muddy water accompanying a traveling of a car is intercepted by the transparent cover 7. This prevents failure due to the breakage and corruption of lens 5B of the camera main body part 5A and each light emitting diode 6A of illumination light source 6.

The transparent cover 7 is formed by bicolor molding wherein cover main part 7A facing with lens 5B of camera main body part 5A and each light emitting diode 6A of illumination light source 6 is fabricated by transparent resin, and frame part 7B surrounding the circumference of the cover main part 7A is fabricated by opaque black resin, for example. And shielding wall 7C for preventing the illumination light from each light emitting diode 6A, from turning in to lens 5B of the camera main body part 5A is fabricated integrally with the opaque frame part 7B. For this reason, at the time of a clouded sky, night or the like, when irradiating and photographing forwardly of lens 5B of the camera main body part 5A by illumination of each light emitting diode 6A, the camera main body part enables a clear picture with no white dotage to be photoed, and a dark portion also can be photoed.

End face of frame part 7B of the portion for covering the concave part 2C and light shielding wall 7C is joined to junction end face of the concave part 2C of the mirror housing 2 through packing 8 as a seal member. And the camera main body part 5A is fixed to the end face of the frame part 7B of the portion that covers photographing window 2B, and shielding wall 7C through packing 9 as a seal member. That is, inside of cover main part 7A of the transparent cover 7 where lens 5B of the camera main body part 5A and each light emitting diode 6A of the illumination light source 6 face is intercepted from the exterior by packing 8 and packing 9. For this reason, even if dirt invades in the mirror housing 2 from the space between opening part 2A (see FIG. 1) of the mirror housing 2, and the circumferential edge of the electric mirror which is not shown or the like, such dirt does not adhere to the inside of cover main part 7A. The cover main part 7A is thus held clean. Consequently, each light emitting diode 6A can irradiate illumination light reliably through clean cover main part 7A, and the camera main body part 5A can photo a clear picture over a long period of time through the clean cover main part 7A.

Here, the camera main body part 5A can be adapted so as to be sensitive to visible light and near-infrared-rays. In this case, as each light emitting diode 6A of the illumination light source 6, the infrared light emitting diode that emits light in near-infrared-rays is adopted. In the inside of cover main part 7A of the transparent cover 7 that faces each light emitting diode 6A, as shown in enlarged view of FIG. 2, infrared transmitting filter 10 is preferably stretched on. This infrared transmitting filter 10 is formed with a resin film, which does not transmit visible light but transmits the infrared rays containing near-infrared-rays. Coating of the multilayer film having such characteristic may be applied over a glass surface.

By the above constitution, the camera main body part 5A can photo a clear picture by the illumination of the near-infrared-rays from an infrared light emitting diode even in the night or the like. Since illumination light is near-infrared-rays and it is not visible to people in that case, other drivers of vehicles or pedestrians cannot be confused. Moreover, since the illumination light source 6 inside concave part 2C cannot be seen from the outside through cover main part 7A of the transparent cover 7 with existence of the infrared transmitting filter 10 as shown in FIG. 3, the fine sight of camera built-in type rearview mirror device improves.

Moreover, if the diffusion lens 11 that diffuses the illumination light from each light emitting diode 6A is formed inside the infrared transmitting filter 10 as shown in FIG. 2 in this case, the diffusion lens 11 diffuses the illumination light from each light emitting diode 6A. Therefore, the camera main body part can photo a bright picture by the diffused illumination light. In this case, the diffusion lens 11 does not appear through cover main part 7A of the transparent cover 7 by the infrared transmitting filter 10 of this side, and does not spoil appearance, either.

Here, coating of the transparent conductive film composed of ITO (Indium Tin Oxide) which has heater function, which is not shown, and tin oxide or the like is applied inside of the cover main part 7A of the transparent cover 7 shown in FIG. 2, wherein lens 5B of the camera main body part 5A is faced at least. A pair of electrodes connected to the power supply, which is not shown through a pair of harness are being fixed to the transparent conductive film. Resistance of the transparent conductive film between the pair of electrodes is set as 40 ohms by adjusting composition and film thickness of the transparent conductive film. Then, if voltage 12V, such as an on-board battery, is impressed among the pair of these electrodes, current of 0.3 A will flow on a transparent conductive film, to thereby constitute a heater with 3.6 W. Inside of the cover main part 7A of the transparent cover 7 is thus heated. Accordingly, even under the weather conditions such that cloudy weather when dew condensation are prone to generate in the inside of cover main part 7A of the transparent cover 7, by electrically energizing a transparent conductive film, fogging and dew condensation are cleared away and the camera main body part 5A can photo a clear picture through the cover main part 7A of the transparent cover 7.

Figure 4:
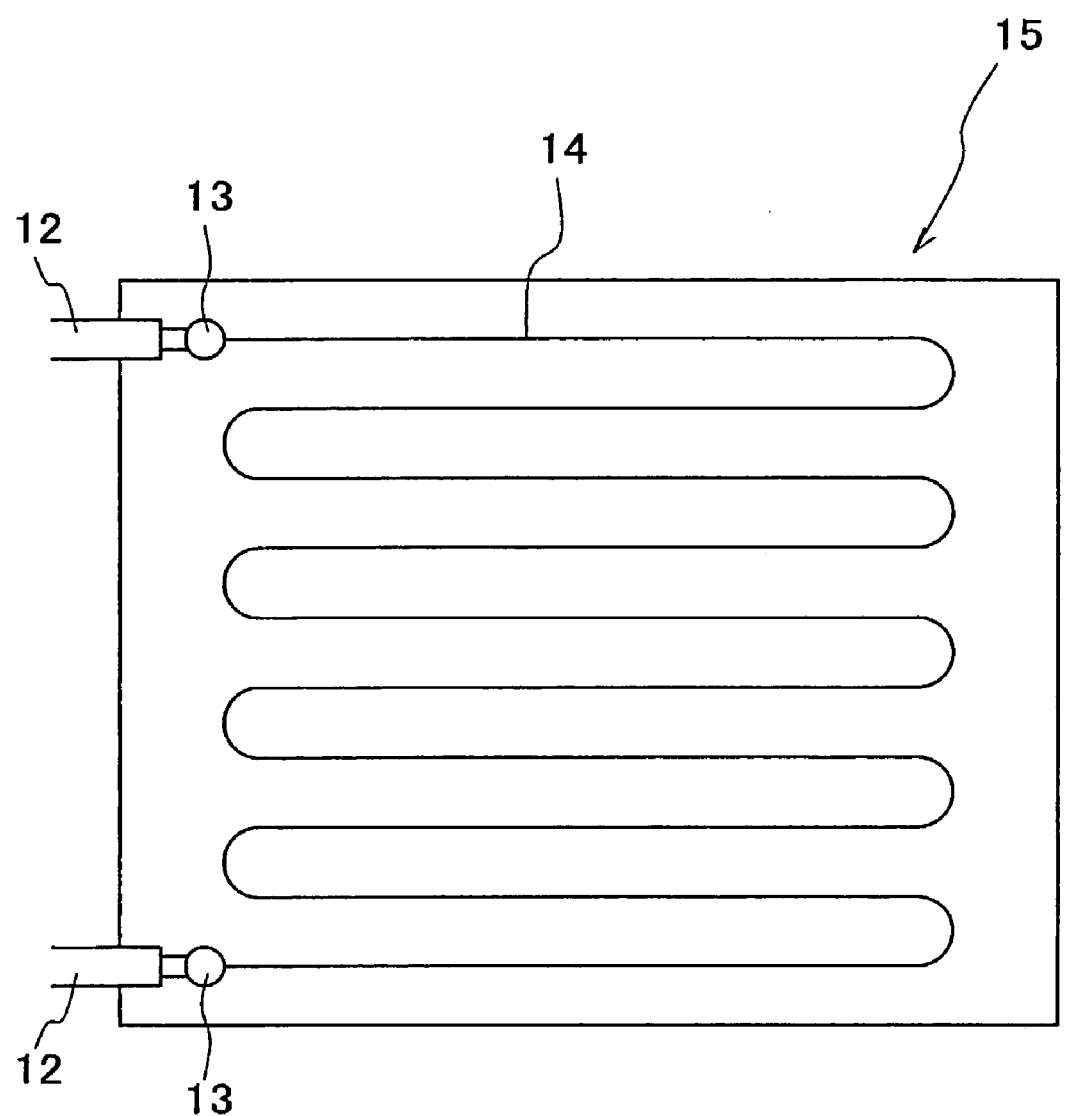
FIG. 4 is a plan view of heat wire transparent coating film used in the inside of a cover main part of the transparent cover as shown in FIG. 2 instead of a transparent conductive film.

In addition, as the transparent conductive film, as shown in FIG. 4, heating wire 14 is connected between the pair of electrodes 13 that is connected to the power supply, which is not shown, through a pair of harness 12. And in heat wire transparent film 15, the heating wire 14 can be drawn around substantially all over the film with meandering pattern. Also in this case, under the weather conditions such that cloudy weather and dew condensation are prone to generate in the inside of the cover main part 7A of the transparent cover 7, by electrically energizing the transparent conductive film, fogging and dew condensation are cleared away and the camera main body part 5A can photo a clear picture through the cover main part 7A of the transparent cover 7.

Moreover, coating of the hydrophilic coating film, which is not shown, is applied over the external surface of the cover main part 7A of the transparent cover 7 as shown in FIG. 2. For this reason, even if water droplet adheres to the external surface of the cover main part 7A of the transparent cover 7, at the time of rainy weather, after car washing, or the like, it spreads in layer structure, without becoming lens-like form, when the hydrophilic film is used. Consequently, the camera main body part 5A can photo a clear picture through the cover main part 7A of the transparent cover 7.

Figure 5A:
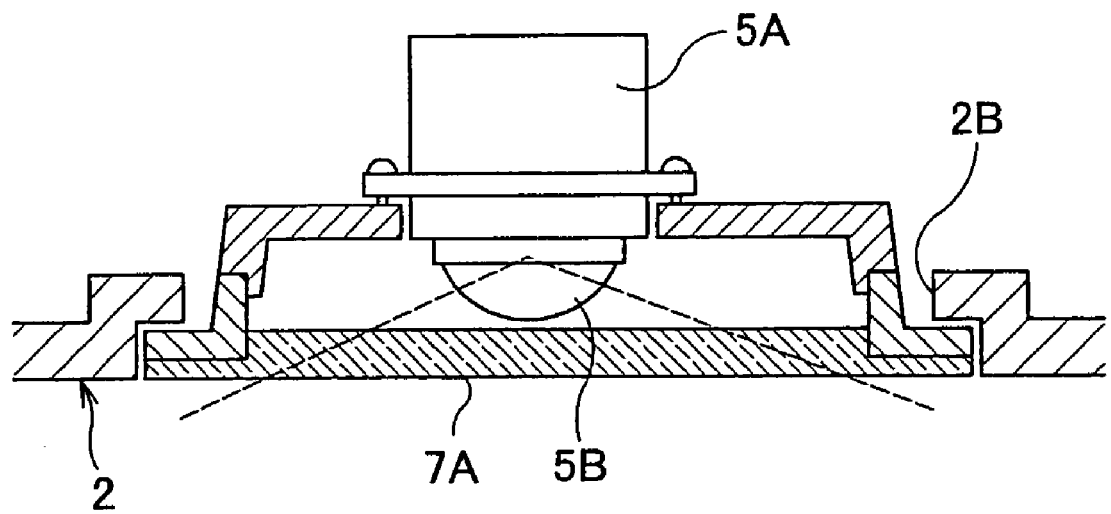
FIG. 5A is a partially enlarged sectional view of one embodiment corresponding to FIG. 2.

Here, in one mode of the camera built-in type rearview mirror device as shown in FIG. 5A, the cover main part 7A of the transparent cover 7 that faces with lens 5B of the camera main body part 5A is formed in flat. For this reason, in order to secure a photographing feasible viewing angle for the lens 5B of a wide angle to be capable of photographing, shown by the broken line, it is necessary to enlarge the cover main part 7A. That is, it is necessary to enlarge opening area of photographing window 2B. However, if opening area of the photographing window 2B is enlarged, the rigidity of the part and the mirror housing 2 falls. This is not preferable.

Figure 5B:
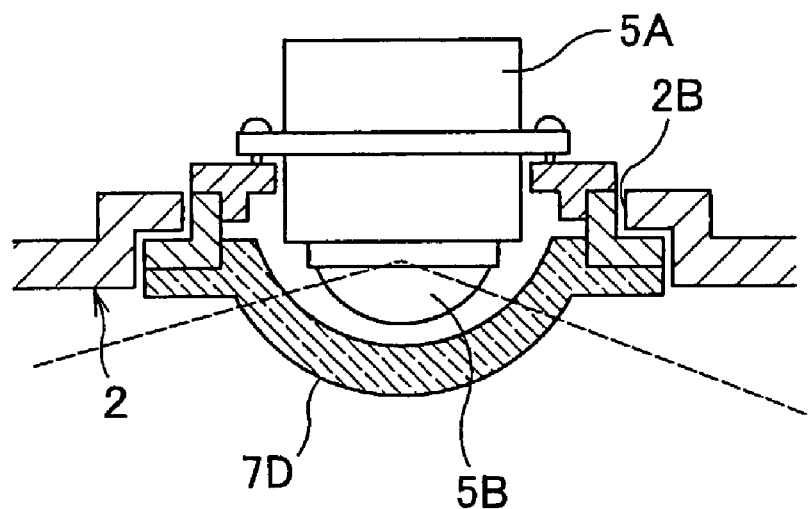
FIG. 5B is a partially enlarged sectional view of other embodiment.
Figure 6:
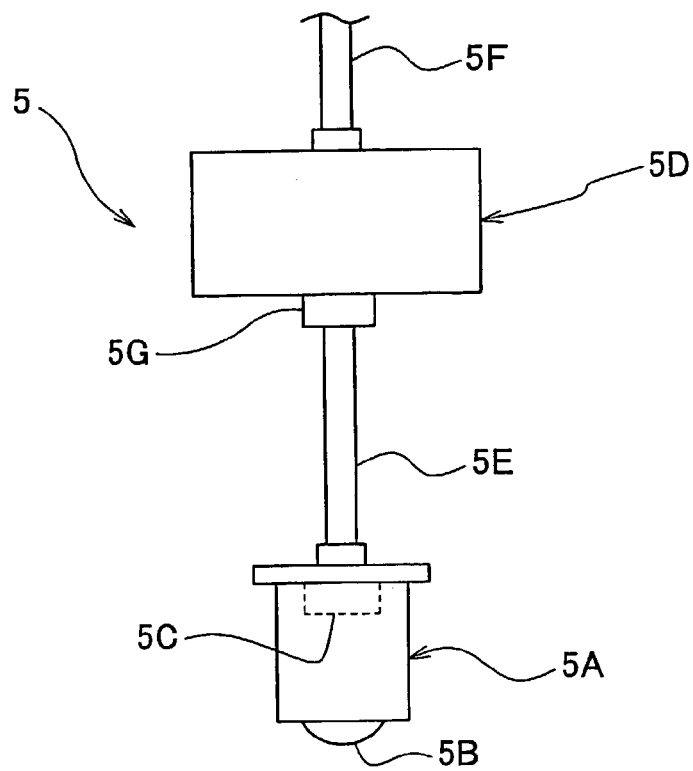
FIG. 6 is a plan view showing a substantial structure of a camera module, which is built in a camera built-in type rearview mirror device according to one embodiment.
Figure 7:
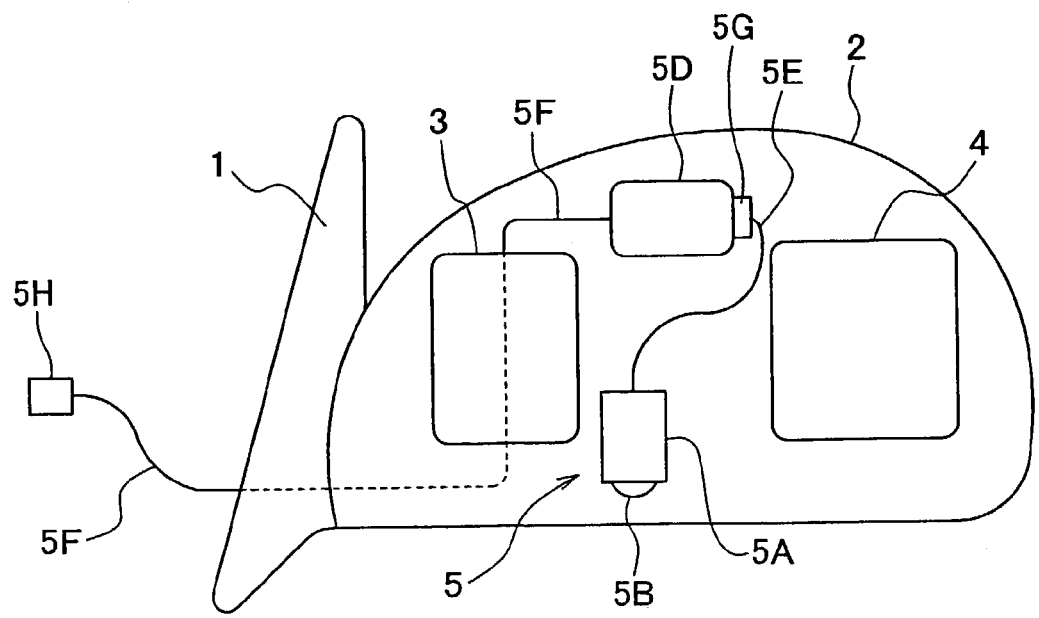
FIG. 7 is an arrangement view of the camera module as shown in FIG. 6 in the mirror housing.

Then, as shown in FIG. 5B as another embodiment, in the camera main body part 7A of the transparent cover 7 that faces with lens 5B of the camera main body part 5A, bulge part 7D having circular curved section is formed so that the lens 5B may rush in. If this bulge part 7D has too large amount of projection, it becomes a causative factor to generate wind noises at the time of a high-speed traveling of a car or a strong wind. Then, the amount of projection of the bulge part 7D is preferably set as about 5 mm 10 mm or less.

Moreover, the outside form of the bulge part 7D has big influences on the wind noises at the time of a high-speed traveling of a car and a strong wind. Then, the outside form of the bulge part 7D is preferably set as a surface of a sphere or an ellipse surface of a sphere. For example, by forming in an ellipse surface of a sphere that is smooth in the longitudinal direction of car, a run wind comes to flow smoothly over the bulge part 7D of the cover main part 7A of the transparent cover 7 at the time of a high-speed traveling of a car and a strong wind. Wind noises are thus reduced.

In another embodiment with above-described constitution, as shown in FIG. 5B, photographing feasible viewing angle which can photo the camera main body part 5A spreads as shown by the broken line, by rush in of lens 5B of the camera main body part 5A into the bulge part 7D. If put in another way, even when the opening area of the photographing window 2B is decreased, required photographing feasible viewing angle can be obtained, and the part and the opening area of the photographing window 2B is decreased accordingly compared with the example shown in FIG. 5A. Accordingly, the rigidity of the mirror housing 2 is raised further. Moreover, in the mirror housing 2, space-margin is obtained when lens 5B of the camera main body part 5A rushes into the bulge part 7D and the position of the camera main body part 5A moves to the transparent cover 7 side.

Moreover, when the camera main body part 5A needs to be arranged near the split line of the mirror housing 2 which is formed of resin, by having the bulge part 7D in the cover main part 7A of the transparent cover 7 as shown in FIG. 5B, photographing feasible viewing angle obtained by the camera main body part 5A so as to be capable of photographing, is not narrowed by design surface, even if the design surface with curvature that changes a lot is formed near the split line of the mirror housing 2. Thus the camera main body part 5A is capable of photographing by required photographing feasible viewing angle.

Here, the camera module 5 is formed in separable type wherein camera main body part 5A and picture signal-processing part 5D are connected through harness 5E. The camera main body part 5A has picture sensor 5C such as CCD (Charge Coupled Device) built in, for receiving light through the lens 5C. And the signal of the picture photoed by the camera main body part 5A is inputted in the picture signal-processing part 5D. The harness 5E is attached to the camera main body part 5A, and is connected to picture signal-processing part 5D through connector 5G of the tip. The length of this harness 5E is set as less than 10 cm so that degradation of a picture signal and mixing of noises which are outputted to picture signal-processing part 5D from the camera main body part 5A can be prevented as much as possible.

The camera module 5 with the above constitution includes the electric storage unit 3 for rotating operation of the mirror housing 2 to the mirror base 1, and a restricted accommodation space where the mirror surface adjusting unit 4 for inclining operation of the electric mirror, the camera main body part 5A and picture signal-processing part 5D is accommodated in separable type of the camera main body part 5A and the picture signal processing part 5D. That is, the main body part of camera 5A is accommodated in the lower part of the mirror housing 2 with a downward posture having lens 5B faced near the photographing window 2B (see FIG. 2) of the mirror housing 2. The picture signal processing part 5D is separately accommodated in the upper part of the camera main body part 5A. And connector 5H of the end part of harness 5F which is connected to the picture signal processing part 5D is drawn in a vehicle compartment through the inside of the mirror base 1, to be connected to the power supply and monitor, which are not shown. Thus, the camera module 5 can display the picture photoed by the camera main body part 5A on the monitor. As described above, according to the embodiment of the present invention, an opening part to be formed adding to a mirror housing is satisfied with only the photographing window where the lens of the camera main body part is faced, to thereby decrease the opening area. In addition, since a concave part, which is arranged near the photographing window in the mirror housing and opens downwardly is formed, the vicinity area of the photographing window is reinforced according to the cross-sectional form of this concave part. Therefore, the rigidity of the mirror housing can be raised and trembling vibration of the mirror or the like can be prevented.

According to the embodiment of the present invention, a transparent cover covers a photographing window and a concave part, obtaining a smooth form with almost no unevenness. Thus, wind noises can be prevented. Also, the transparent cover intercepts a rebound of the pebble and muddy water accompanying a traveling of a car. Thus failure due to the breakage and corruption of the camera main body part or an illumination light source can be prevented. Furthermore, inside of the transparent cover where a lens and an illumination light source of the camera main body part are arranged in a facing manner, is intercepted from the exterior by a seal member. Adhesion of dirt is thus prevented so as to be held clean. Consequently, the illumination light source can irradiate illumination light reliably through a clean transparent cover, and the camera main body part can photo a clear picture over a long period of time through a clean transparent cover.

According to the embodiment of the present invention, photographing feasible viewing angle where the photography is possible spreads because the lens of the camera main body part rushes into a bulge part of a transparent cover. If put in another way, required photographing feasible viewing angle can be obtained even if the opening area of a photographing window is decreased. Accordingly, the rigidity of mirror housing can be raised further by decreasing the opening area of the photographing window more. In addition, since a run wind flows the external surface of a transparent cover smoothly in the external surface of the bulge part of the transparent cover, which is a smooth ellipse surface of a sphere for example at the time of a high-speed traveling and a strong wind, wind noises can be reduced.

According to the embodiment of the present invention, by the illumination light from an illumination light source, photography of the camera main body part is achieved even in the night or the like.

According to the embodiment of the present invention, a shielding wall prevents the illumination light from an illumination light source, from turning in to the lens of the camera main body part. The camera main body part does not have white dotage, and a clear picture of even a dark portion can be obtained.

According to the embodiment of the present invention, since the illumination light from an illumination light source diffuses by a diffusion lens, photography of a bright picture of the camera main body part is achieved. In addition, when the diffusion lens is provided inside the infrared transmitting filter, a diffusion lens does not appear from the outside to thereby good-looking is achieved.

According to the embodiment of the present invention, the camera main body part can photo a clear picture with illumination of near-infrared-rays even in the night and the like. Since illumination light is near-infrared-rays and it is not visible to people in that case, other drivers of vehicles or pedestrians cannot be confused.

According to the embodiment of the present invention, since the illumination light source accommodated in a concave part by the infrared transmitting filter cannot be seen from the outside, the fine sight of camera built-in type rearview mirror device improves.

According to the embodiment of the present invention, since the fogging of the inside of a transparent cover and dew condensation can be prevented by the heater function of a transparent conductive film or heat wire transparent film, the camera main body part can photo a clear picture through a transparent cover.

According to the embodiment of the present invention, even when water droplet adheres to the external surface of a transparent cover, the water droplet spreads in layer structure, without becoming lens-like form when the hydrophilic coating film is used, at the time of rainy weather or after car washing, or the like. Thus the camera main body part can photo a clear picture through a transparent cover.

According to the embodiment of the present invention, the camera main body part forming a camera module, and a picture signal-processing part are not integrally formed with a picture signal processing part, but are formed in separable type connected through harness. In the mirror housing with restricted accommodation space with a mirror surface adjusting actuator and a motor-driven containing unit accommodated therein like the motor-driven containing type mirror housing equipped with an electric mirror, a picture signal-processing part is easily accommodated together with the camera main body part.

What is claimed is:

1. A camera built-in rearview mirror device comprising:
    a mirror housing having a bottom portion in which a through hole and a concave part are formed;
    a mirror provided in the mirror housing;
    a camera module including a lens and provided in the through hole such that the lens faces outside of the mirror housing; and
    an illumination light source provided in the concave part, wherein
    the mirror housing is equipped with a transparent cover to cover the through hole and the concave part, and a camera main body part of the camera module is fixed to the transparent cover through a seal member.

2. A camera built-in rearview mirror device as claimed in claim 1, wherein a bulge part with circular curved section is formed in the cover so that the lens of the camera main body part may rush in.

3. A camera built-in rearview mirror device as claimed in claim 1, wherein a shielding wall is formed between the camera main body part and the illumination light source in the transparent cover.

4. A camera built-in rearview mirror device as claimed in claim 1, wherein a diffusion lens configured to diffuse illumination light from the illumination light source is provided in an inside of the transparent cover.

5. A camera built-in rearview mirror device as claimed in claim 1, wherein the illumination light source is configured to emit near-infrared-rays, and the camera main body part has sensitivity to the near-infrared-rays.

6. A camera built-in rearview mirror device as claimed in claim 5, wherein the transparent cover includes an infrared transmitting filter provided inside of a portion that covers the concave part where the illumination lighting source is accommodated.

7. A camera built-in rearview mirror device as claimed in claim 1, wherein a coating of a transparent conductive film or heat wire transparent film having a heating function is applied inside of the transparent cover.

8. A camera built-in rearview mirror device as claimed in claim 1, wherein a coating of a hydrophilic coating film is applied over an external surface of the transparent cover.

9. A camera built-in rearview mirror device as claimed in claim 1, wherein the camera module is constituted of a separable type wherein the camera main body part and a picture signal-processing part are connected through a harness.

* * * * *